United States Patent [19]
Wenglar

[11] 3,784,157
[45] Jan. 8, 1974

[54] BUTTERFLY VALVE STEM SEAL ENERGIZER

[75] Inventor: Frank G. Wenglar, Houston, Tex.

[73] Assignee: FMC Corporation, San Jose, Calif.

[22] Filed: May 15, 1972

[21] Appl. No.: 253,369

[52] U.S. Cl............. 251/306, 251/173, 137/454.2, 251/317
[51] Int. Cl............................................. F16k 1/22
[58] Field of Search.................... 251/306, 305, 307, 251/308, 314, 316, 317, 148, 157, 158, 159, 160, 161, 162, 170, 171, 172, 173, 192; 137/454.2, 454.6

[56] References Cited
UNITED STATES PATENTS

| | | | |
|---|---|---|---|
| 3,705,707 | 12/1972 | Scaramucci.................. | 251/316 X |
| 3,598,365 | 8/1971 | Werra............................ | 251/307 |
| 3,341,170 | 9/1967 | Housworth..................... | 251/306 |
| 3,517,689 | 6/1970 | Roos.............................. | 251/306 X |
| 3,534,939 | 10/1970 | Frazier et al................... | 251/306 |
| 3,346,005 | 10/1967 | Hanssen......................... | 251/306 X |

Primary Examiner—Samuel Scott
Assistant Examiner—Ira S. Lazarus
Attorney—F. W. Anderson et al.

[57] ABSTRACT

A butterfly valve with an improved valve stem seal that maintains a positive seal with a valve disc. In the valve, a removeable valve seat assembly fitted within the valve body is provided with rigid sleeve-type seat energizers disposed about the valve stems to compress liner material of the seat assembly into sealing contact with adjacent valve disc surface portions. Each seat energizer is disposed in a radial bore in the valve seat assembly with its radially outermost end pushed radially inward by the valve body to compress seat liner material between the valve disc and the radially innermost end of the seat energizer.

14 Claims, 4 Drawing Figures

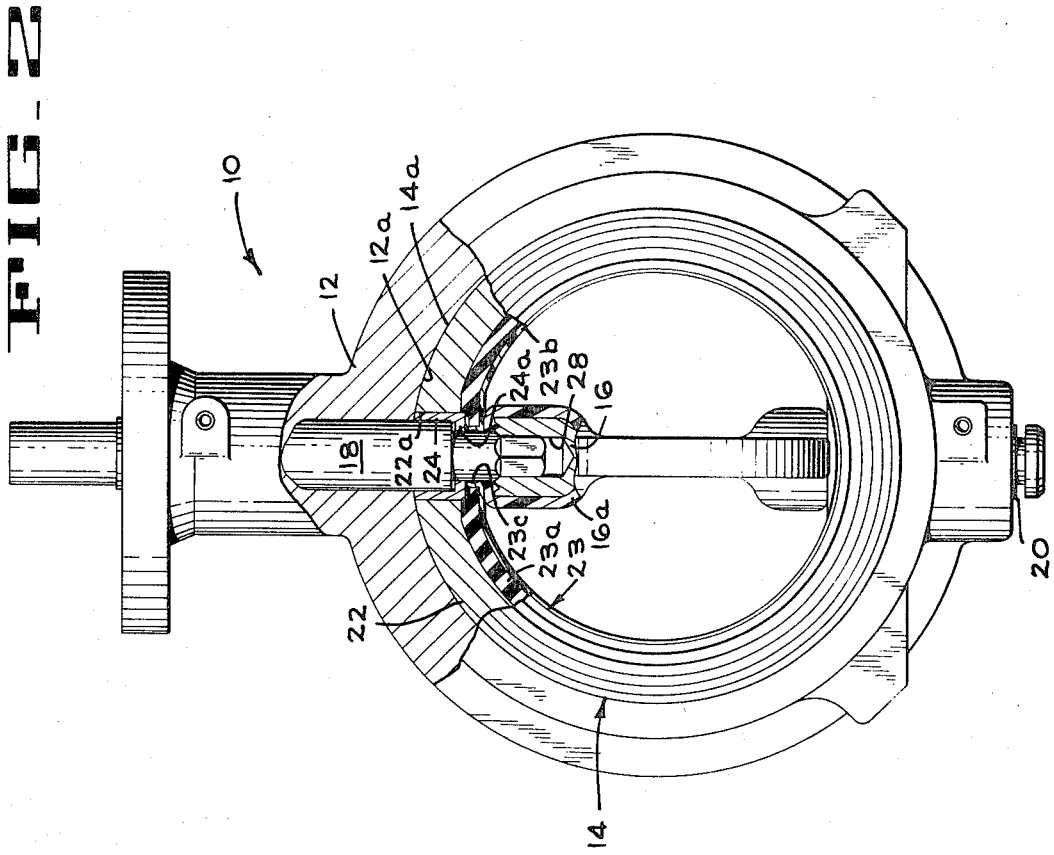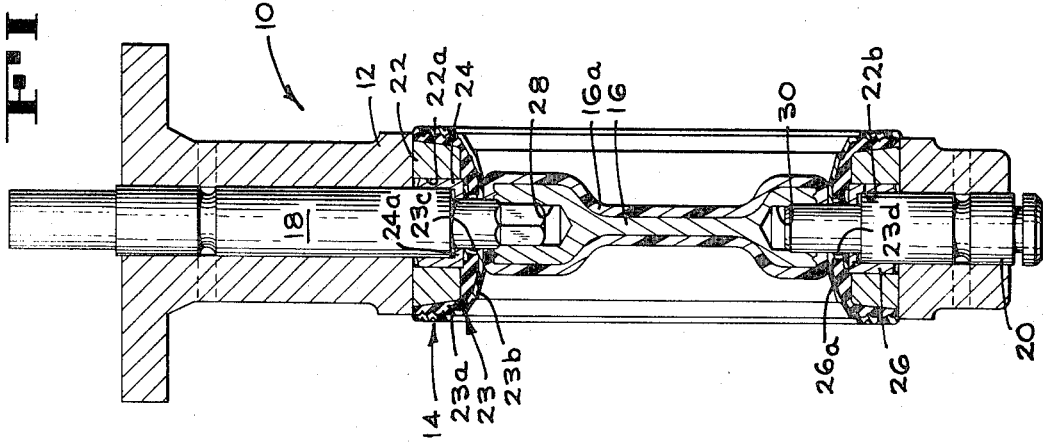

BUTTERFLY VALVE STEM SEAL ENERGIZER

BACKGROUND OF THE INVENTION

1. Field of the Invention

This invention relates to butterfly valves with improved primary stem seals.

2. Description of the Prior Art

Butterfly valves conventionally may include an annular valve body, an annular valve seat assembly fitted within the valve body, a valve disc disposed within the valve seat assembly, and pivot stems attached to the valve disc. Certain prior art valves of this type have had seal deficiencies around the stems where they are attached to the valve disc. Furthermore, it is recognized that even the best seals may wear and leak in time.

Most prior art butterfly valves incorporate a primary stem seal and a secondary stem seal that provides insurance against fluid leakage along the stems due to deficiencies of the primary stem seal. A valve of this latter type is described in the U. S. Pat. No. 3,341,170 to Gordon C. Housworth.

It is not always expedient or desirable to utilize a secondary stem seal in addition to a primary stem seal in a butterfly valve. Many prior art butterfly valves are intended to be used in handling highly corrosive fluid substances that are capable of destroying most metal and elastomeric materials that are commonly utilized in valves. These valves will often have parts such as the valve disc or valve seat covered or lined with a material, such as tetrafluoroethylene, that is inert with respect to the corrosive fluid to be handled. In such valves a secondary seal may actually be undesirable and may sometimes be of little use. By way of example, any corrosive fluid substance working its way past the primary seal will come into contact with a valve stem, which is usually made of metal, to chemically attack the valve stem and cause resultant failure of the valve. By way of further example, the seat members of these corrosive service valves are usually comprised of an elastomeric material such as rubber; and any acid fluid or the like passing the primary seal at the valve stem will chemically attack the elastomeric material.

In the prior art that has been found by the applicant, the problem of providing a valve stem seal has been approached in various ways. These ways do not particularly resemble the approach followed by the applicant that prevents fluid leakage from one side of the valve to the other around the stem and along the stem through the valve seat assembly. Thus, for example, the approach described in U. S. Pat. No. 2,054,369 to Francis Jr. involves the use of a sleeve-type seal energizer that surrounds a valve stem to which an elastic stem seal element is bonded. Fluid pressure admitted through an inlet in the valve body pushes the radially outward end of the seal energizer in a radially inward direction to compress the elastic stem seal element between the seal energizer and the valve disc.

In view of the various drawbacks of the butterfly valves of the prior art it is considered desirable to provide a butterfly valve intended for use in highly corrosive applications that includes a removeable valve seat assembly fitted within a valve body, which seat assembly includes a sleeve-type stem seal energizer for effecting a seal around the valve stem between the seal energizer and the valve disc, in order that the desired sealing action can be obtained in an effective and expeditious manner.

SUMMARY OF THE INVENTION

The present invention provides butterfly valves with improved stem seals characterized in that a rigid sleeve-type stem seal energizer is utilized to compress a body portion of liner material on a valve seat member between a radially inward end of the energizer and a valve disc. The butterfly valves fitted with the stem seal energizer of this invention are particularly suited for utilization in the handling of highly corrosive fluid substances.

An important feature of the present invention is that it is possible to energize the stem seal energizes of the present invention by simply fitting the seat assembly with the energizer into the valve body to cause radial inward displacement of the energizer by the valve body's inner annular surface. This effects compression of body portions of a resilient liner provided on the inside periphery of the seat assembly, and involves a camming action by the inside periphery of the valve body against the radially outward ends of the seat energizer during axial insertion of the seat assembly into the valve body.

The butterfly valve provided by this invention includes a valve body, a valve seat assembly fitted within the valve body, a valve disc disposed in the valve seat assembly, and a pivot stem attached to the valve disc. The valve seat assembly includes an annular valve seat element with a liner having a resilient compressible portion surrounding the valve's stem, this portion being partly or wholly of elastomeric material. The seat element also includes a radial through bore, and the liner also is provided with a radial through bore, of smaller diameter than the seat element's bore, in registry with it. In accordance with the invention, a generally tubular sleeve is disposed within the seat element radial bore, with its radially outward end contacting the inside periphery of the valve body, and with its radially inward end contacting a surface zone of the liner in such manner as to compress the liner, surrounding the stem between a radially adjacent portion of the valve disc periphery and the radially inward end of the sleeve.

The butterfly valve provided by this invention more particularly includes a valve seat assembly that can be fitted into a valve body, and that comprises, in combination, an annular valve seat member having a liner on the inside periphery thereof. The seat member and liner each have a body portion that defines a radial bore. The liner's radial bore is in registry with the seat member's radial bore and is of lesser diameter. A rigid cylindrical sleeve is fitted within the seat member radial bore in surrounding relation to the valve stem. The sleeve has a radially inward end contacting a surface zone of the aforementioned body portion of the liner. The sleeve has a radially outward end protruding from within the seat member bore in such manner that at least two diametrically opposed peripheral end portions of the sleeve extend radially outward and beyond surrounding diametrically opposed edge portions of the valve member radial bore.

It is, accordingly, an object of the present invention to provide an improved stem seal arrangement in a butterfly valve.

The above and other objects of the invention, as well as advantages and features thereof, will be made more clear upon review of the following discussion of an em-

BRIEF DESCRIPTION OF THE DRAWINGS

FIG. 1 is a central longitudinal vertical section of a butterfly valve embodying the present invention, with the valve's disc in the closed position.

FIG. 2 is a front elevation of the valve of FIG. 1, with a portion broken away to better illustrate the stem seal energizer of the present invention, and with the valve's disc in the open position.

DESCRIPTION OF A PREFERRED EMBODIMENT

Figure 3:
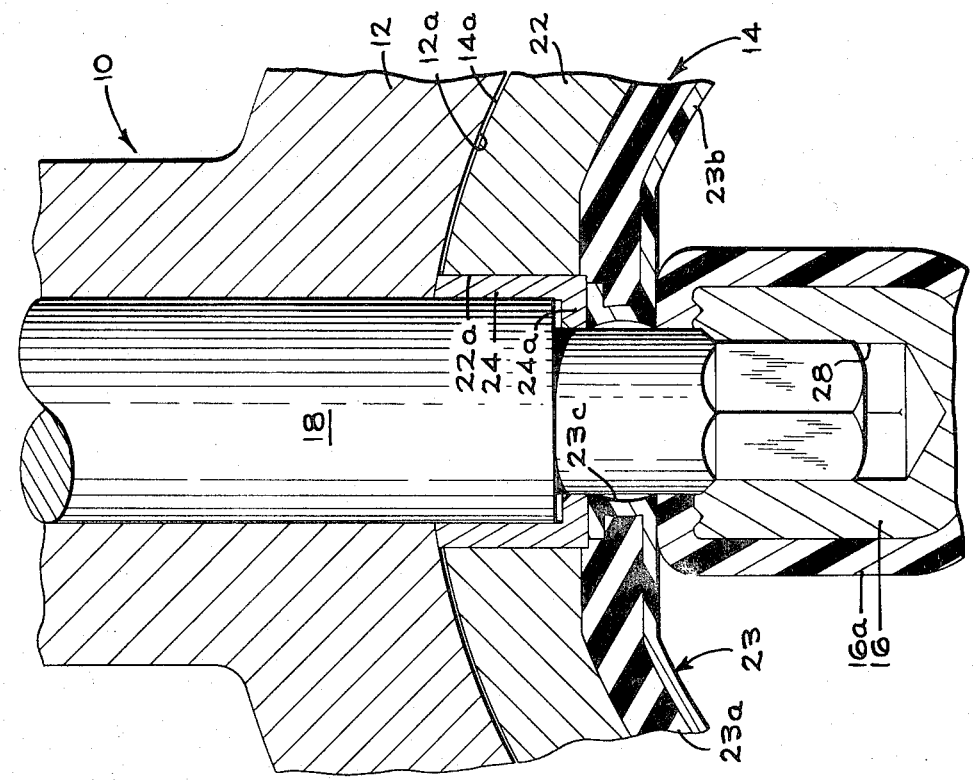
FIG. 3 is an enlarged fragmentary view of a portion of a valve body and its seat assembly fitted with a stem seal energizer according to the invention, showing the seat assembly partially inserted into the valve body.

The butterfly valve 10 that is illustrated in FIGS. 1 to 4 incorporates an embodiment of the present invention in a manner to be explained hereinafter. The illustrated valve 10 includes an annular valve body 12, an annular valve seat assembly 14, a valve disc 16 and two shaft stems 18, 20 all assembled in the manner depicted in FIGS. 1 and 2 in particular.

In accordance with the present invention, the valve seat assembly 14 includes a rigid annular seat member 22 with a liner 23 of suitable material and provided with two rigid metallic sleeves 24,26 that are disposed in bores 22a, 22b formed in the seat member 22. The physical relation between the sleeves 24,26 the seat member 22, and the seat member's liner 23 is such that, as will be next explained, a positive sealing of the disc to the liner is provided at the area where the stems 18,20 project into stem receiving bores 28,30 formed in the valve disc 16.

The seat member's liner 23 can be constructed entirely of elastomeric material, or partially thereof and partially of another suitable material. The illustrated liner 23 is a composite of a first liner element 23a of suitable elastomeric material such as rubber or the like, and a second liner element 23b composed of a less elastomeric material such as polytetrafluoroethylene, etc., that is corrosion resistant and thus protects the liner element 23a from corrosion or chemical attack by contact with the particular corrosive fluid handled by the valve 10. The disc 16 is preferably, but not necessarily, encapsulated with a cover 16a of polytetrafluoroethylene or the like.

It is not entirely essential that the liner 23 be comprised of two liner elements 23a, 23b as is shown herein. It is possible, in the practice of the invention, to provide a liner 23 composed entirely for example of an elastomeric material such as rubber, or the like. It can, nevertheless, be readily appreciated that certain significant advantages accrue from the use of a liner 23 constituted by two different materials as herein described. The liner 23 includes body portions that define radial bores 23c, 23d extending entirely therethrough into registry with the bores 22a, 22b of the seat member 22. The bores 22a, 22b of the seat member 22 are of a diameter larger than the diameter of the bores 23c, 23d.

The sleeves 24,26 each include a tubular body having a radial, inwardly directed flange 24a, 26a at the radially inward end thereof. The flanges 24a, 26a each define a central opening with a bevelled edge in which a reduced diameter portion of respective stem 18 or 20 is journalled. Each sleeve 24,26 preferably, but not necessarily, has a conical bevel on its radially outward end. The bevel angle corresponds to the curvature of the inside periphery 12a of the valve body 12. Specifically, the radially outward sleeve ends are bevelled to make four point contact with the valve body inside periphery 12a in the manner illustrated in FIG. 4.

Figure 4:
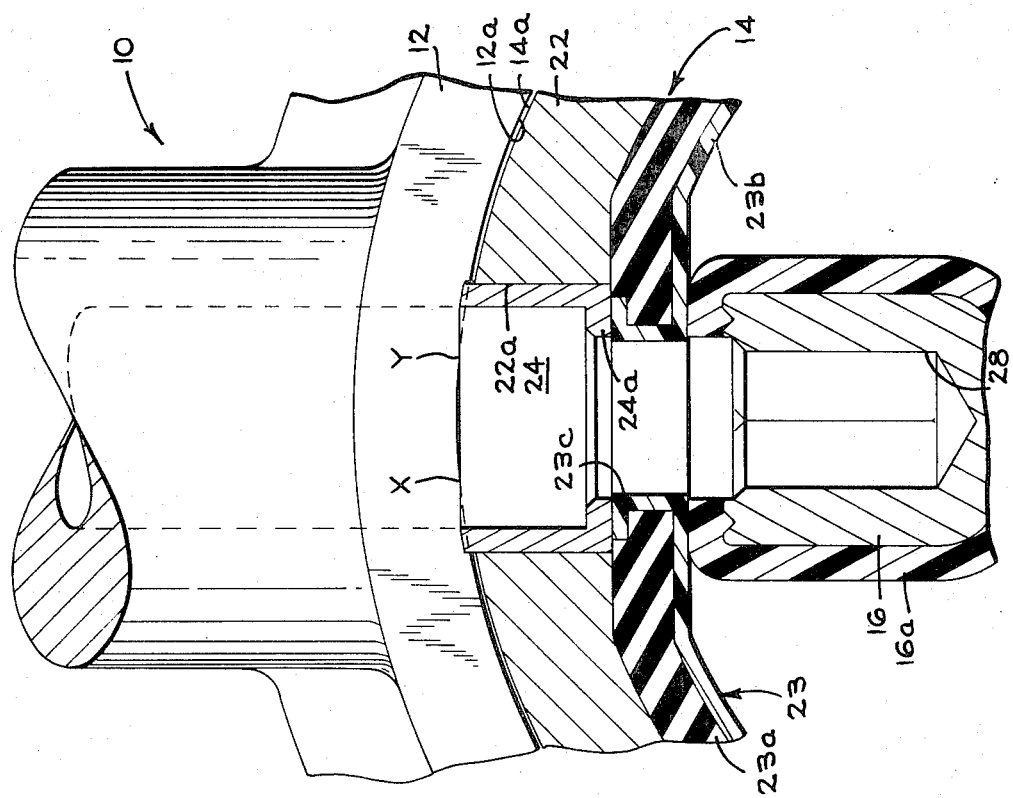
FIG. 4 is a section similar to FIG. 3, showing the seat assembly fully inserted into the valve body and the valve stem in place.

FIGS. 3 and 4 illustrate the way in which the seat assembly 14 and valve disc 16 may be inserted into the valve body 12 in order to assemble the valve 10 shown in FIGS 1 and 2. FIGS. 3 and 4 also illustrate, on a larger scale than FIGS. 1 and 2, the salient features of the present invention insofar as it relates to the provision of a stem seal about a stem that is attached to a valve disc.

In order to assemble the valve 10, the seat assembly 14 and disc 16 are aligned with the axial cavity of the valve body 12, with the seat assembly 14 and disc 16 positioned adjacent one side of the valve body 12. This brings the valve components into the physical relationship shown in FIG. 3. The seat assembly 14, with the disc 16 disposed within the central opening thereof, is then pushed into the valve body 12 to bring the valve components into the physical relationship shown in FIG. 4. After this has been done, the stems 18, 20 are installed to result in the valve assemblage shown in FIGS. 1, 2 and 4.

During the movement of the seat assembly 14 into the valve body 12 the sleeves 24,26 are forced radially inward by the valve body 12 to compress the liner body portions that surround the liner's radial bores 23c, 23d between the valve disc 16 and the valve seat member 22. It is this movement, accomplished in a fashion to be explained, that involves a use of the concept underlying the present invention.

The sleeves 24,26 are dimensioned in relation to the dimensions of the seat member bores 22a, 22b. More particularly, the end-to-end length of each sleeve 24,26 is selected so that its radially outward end projects to a certain extent slightly radially beyond the circular edges of corresponding seat member radial bores 22a, 22b.

By way of explanation, it is now noted that the cylindrical curvature of the seat member's outside periphery 14a is such that before the insertion of the seat assembly 14 into the valve body 12, two diametrically opposed arcuate segments of each sleeve's radially outward end protrude radially outward and beyond the curved plane of the seat member's outside periphery 14a. Also, before insertion of the seat assembly 14 into the valve body 12, two diametrically opposed arcuate segments of each sleeve's radially outward end are disposed radially inward of the curved plane of the seat member's outside periphery 14a. This physical relationship may be more clearly understood with reference to what is shown in FIG. 3.

During sideward movement of the seat assembly 14 into the valve body 12, the seat member 22 will enter sidewise into the valve body until the sleeves 24,26 become positioned immediately laterally adjacent one end of the valve body 12. Further sidward movement of the seat assembly 14 into the valve body 12 causes the inside periphery 12a of the valve body 12 to come into contact with the radially outward ends of each sleeve 24,26, as shown in FIG. 3. At this position each sleeve is in contact with the valve body at two points, indicated as "X" and "Y" in FIG. 3, on the sleeve's radially outward end, which points are peripherally spaced apart less than 90°.

Further sideward movement of the seat member 22 into the valve body 12 causes the valve body's inside periphery 12a to push, by way of a camming action, the sleeves 24,26 radially inward until each sleeve 24,26 assumes a position like that shown in FIG. 4. The radial inward movement of each sleeve 24,26 causes the liner body portions surrounding the liner's radial bores 23c, 23d to undergo compression between the radially inward sleeve ends and the radially adjacent portions of the valve disc 16. The result is that the sleeves 24,26 form a positive seal around the stems 18, 20 by compressing the liner material around the stems and against the valve disc 16.

The sleeves 24,26 in this instance include end flanges 24a, 26a that provide for wide area contact of the sleeves with the radially adjacent liner material. However, the sleeves 24,26 need not in all instances include such end flanges. Thus, for example, the sleeves can be flange-less tubular members with a radial thickness between their inside and outside surfaces comparable to the radial dimension of the sleeve flanges 24a, 26a. Such sleeves could be utilized in conjunction with stems that are of constant diameter at the longitudinal portions thereof that are immediately radially adjacent the valve disc.

The liner 23 in this instance includes tubular extensions of the liner element 23b that form the peripheral wall of the liner's bores 23c, 23d. In this instance the liner element 23b also includes annular extension 23e that are contacted by the radially inward ends of the sleeves 24,26. Either or both of these extensions may be eliminated and replaced by extensions of the liner element 23a in appropriate instances.

Although the best mode contemplated for carrying out the present invention has been herein shown and described, it will be apparent that modification and variation may be made without departing from what is regarded to be the subject matter of the invention.

What is claimed is:

1. A valve comprising, in combination, a valve body, a valve seat assembly axially slidable into and fitted within the valve body, a valve disc disposed in the valve seat assembly, a pivot stem attached to the valve disc, said valve seat assembly including an annular valve seat member having a liner thereon that includes elastomeric material, a radial bore in and extending entirely through the seat member, a rigid sleeve disposed in the radial bore, the sleeve being fitted about the pivot stem, a body portion of the liner forming a through bore in registry with the seat member bore, the length of said sleeve being greater than the axial dimension of the seat member bore by an amount not exceeding the amount the liner's body can be compressed, said sleeve terminating in a radially outward end that bears against the inside periphery of the valve body and having a radially inward end that bears against a surface zone of the body portion of the liner in such manner as to compress the body portion of the liner between a radially adjacent portion of the valve disc periphery and the radially inward end of the sleeve.

2. The combination set forth in claim 1 wherein the radially outward end of the sleeve is bevelled about its peripheral end surface.

3. The combination set forth in claim 1 wherein the liner is formed by a first liner element composed of relatively elastic material, and by a second liner element composed of material that is less elastic than that of the first liner element.

4. The combintaion set forth in claim 1 where in the sleeve includes a radially inwardly directed flange at its radially inward end defining a circular hole therethrough sized to accommodate therein a portion of the pivot stem.

5. The combination set forth in claim 1 wherein the outer periphery of the seat member is of such curvature that diametrically opposed portions of the radially outward end of the sleeve will extend radially outward beyond corresponding, diametrically opposed edge portions of the seat member's bore.

6. A valve seat assembly, which can be slid axially into fitted position in a valve body, comprising, in combination, an annular valve seat member having a liner on the inside periphery thereof, the seat member having a body portion defining a radial bore that extends from the outside periphery to the inside periphery of the seat member, the liner having a body portion defining a radial bore that extends through the liner and is in registry with the seat member radial bore, the liner radial bore being of a diameter less than the diameter of the seat member radial bore, a rigid cylindrical sleeve fitted within the seat member radial bore with its radially inward end contacting a surface zone of the aforementioned body portion of the liner and with at least two diametrically opposed peripheral portions of its radially outward end extending radially outward and beond surrounding diametrically opposed edge portions of the seat member radial bore, the length of said sleeve being greater than the axial dimension of the seat member bore by an amount not exceeding the amount the liner's body can be compressed.

7. The combination set forth in claim 6 wherein the sleeve is made of metallic material.

8. The combination set forth in claim 6 wherein the sleeve is bevelled at its radially outward end.

9. The combination set forth in claim 6 wherein the outside periphery of the seat member has a cylindrical curvature such that at least diametrically opposed peripheral portions of the radially outward end of the sleeve lie radially inward of surrounding diametrically opposed edge portions of the seat member radial bore.

10. The combination set forth in claim 6 wherein the liner is comprised of a first liner element adjacent the seat member and a second liner element adjacent the first liner element, and wherein the material of the first liner element has greater elasticity than the material of the second liner element.

11. The combination set forth in claim 10 wherein the second liner element includes a tubular body portion that lines the first liner element's radial bore.

12. The combination set forth in claim 10 wherein the second liner element includes an annular body portion that is contiguous with the remainder of the second liner element and that provides an annular body region surrounding the first liner element's radial bore to provide the aforementioned surface zone of the liner.

13. The combination set forth in claim 10 wherein the first liner is made of elastomeric material.

14. The combination set forth in claim 10 wherein the outside periphery of the seat member has a cylindrical curvature and wherein the length end-to-end of the sleeve relative to the length end-to-end of the seat member radial bore is such that at least diametrically opposed peripheral portions of the radially outward end of the sleeve lie radially outward of surrounding diametrically opposed edge portions of the seat member radial bore which are in peripherally spaced relation.

* * * * *